United States Patent
Quick et al.

(10) Patent No.: US 6,292,349 B1
(45) Date of Patent: *Sep. 18, 2001

(54) CAPACITOR

(75) Inventors: Nathaniel R. Quick, Lake Mary, FL (US); Clinton V. Kopp, Bismark, ND (US); Michael Liberman; Alexander Sobolevsky, both of Deland, FL (US); Michael C. Murray, Eustis, FL (US)

(73) Assignee: USF Filtration and Separations Group, Inc., Timonium, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/515,074

(22) Filed: Feb. 28, 2000

Related U.S. Application Data

(62) Division of application No. 09/094,395, filed on Jun. 9, 1998, now Pat. No. 6,046,091.
(60) Provisional application No. 60/049,139, filed on Jun. 10, 1997.

(51) Int. Cl.[7] ............................... H01G 4/228; H01G 4/06
(52) U.S. Cl. ..................... 361/306.1; 361/311; 29/25.42
(58) Field of Search ................................ 361/301.5, 303, 361/306.1, 308.1, 308.3, 328, 321.6, 321.2; 29/25.42

Primary Examiner—Anthony Dinkins
(74) Attorney, Agent, or Firm—Frijouf, Rust & Pyle, P.A.

(57) ABSTRACT

An apparatus and process for making a capacitor having a first capacitor plate element covered with a spacing material selected for forming a capacitor dielectric. The first capacitor plate element and the spacing material is encased with a second capacitor element. The second capacitor plate element is drawn for reducing the outer diameter thereof. A multiplicity of the capacitor elements are inserted within a second capacitor plate connector. The second capacitor plate connector is drawn for reducing the outer diameter of the metallic tube and for electrically interconnecting the multiplicity of the second capacitor plate elements with the second capacitor plate connector to form a second capacitor plate. The multiplicity of the first capacitor elements are interconnected with a first capacitor plate connector to form a first capacitor plate. The spacing material is replaced with a dielectric material to form the capacitor thereby.

19 Claims, 14 Drawing Sheets

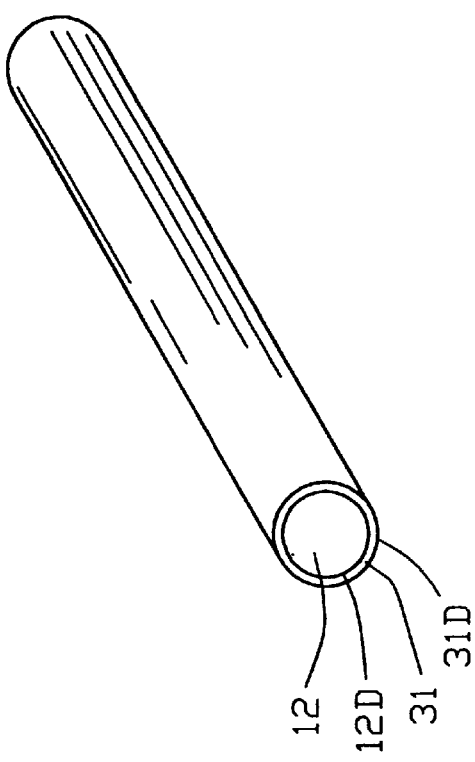
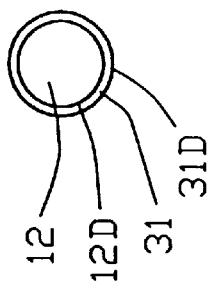
FIG. 5
FIG. 5A
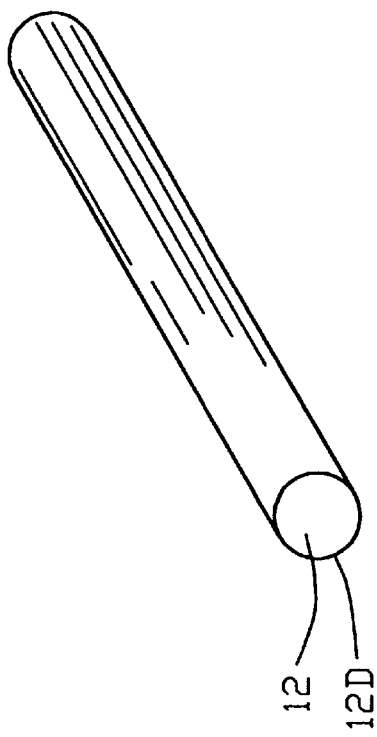
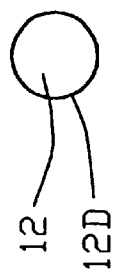
FIG. 4
FIG. 4A

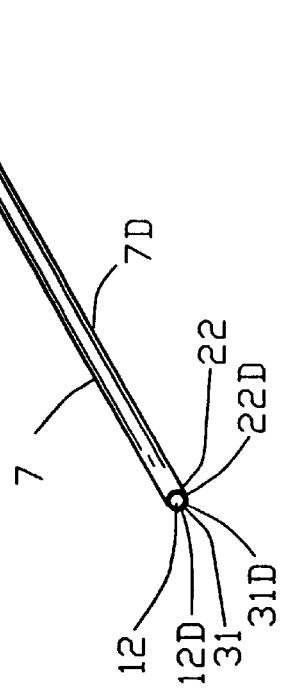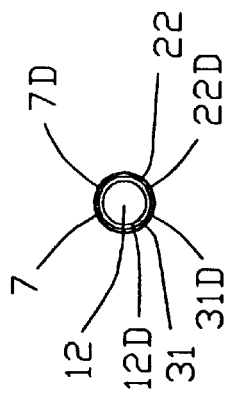
FIG. 7
FIG. 7A
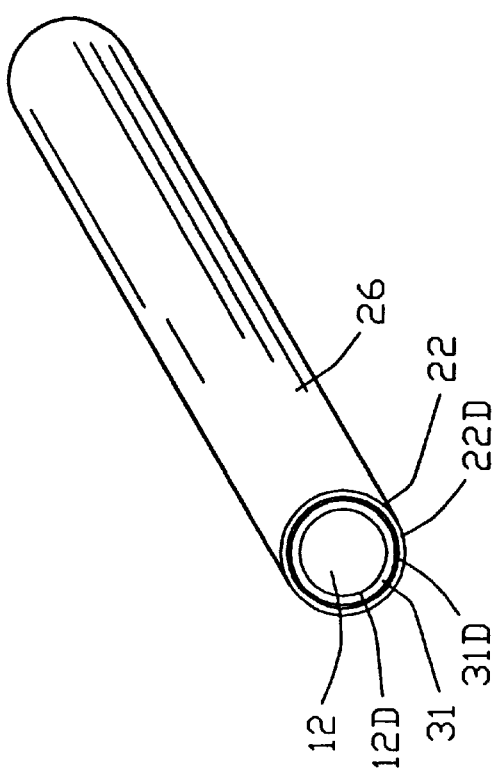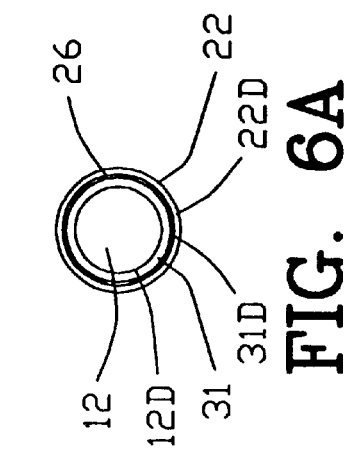
FIG. 6
FIG. 6A

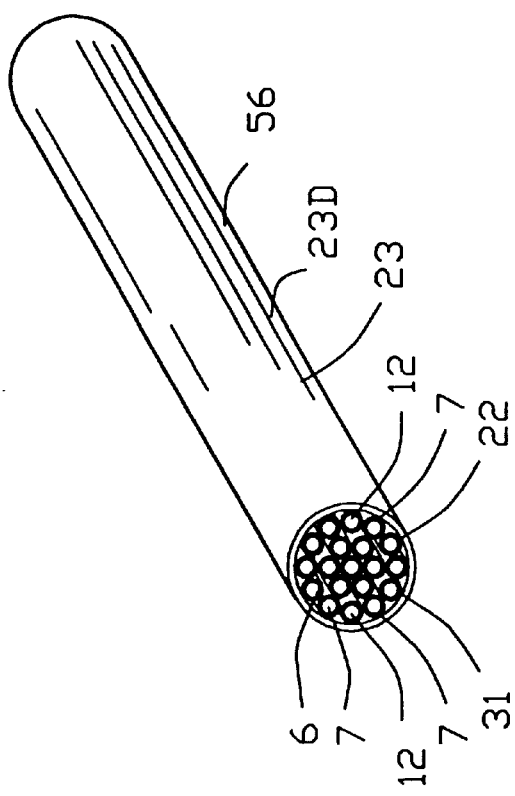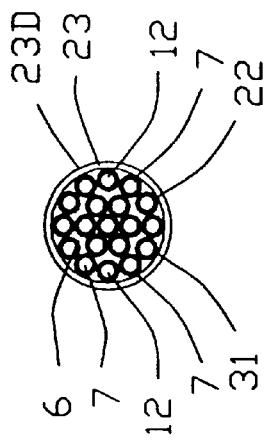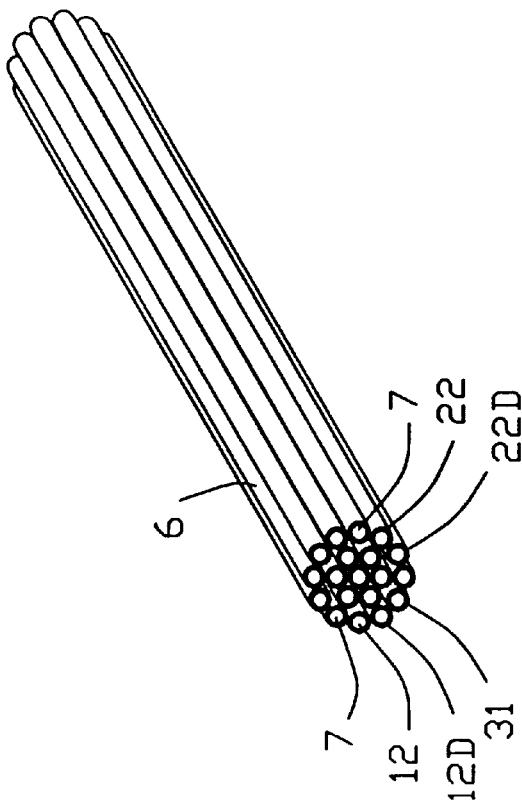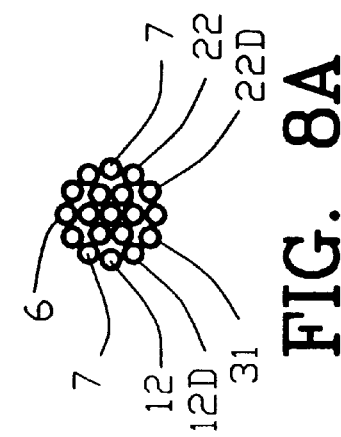
FIG. 9
FIG. 9A
FIG. 8
FIG. 8A

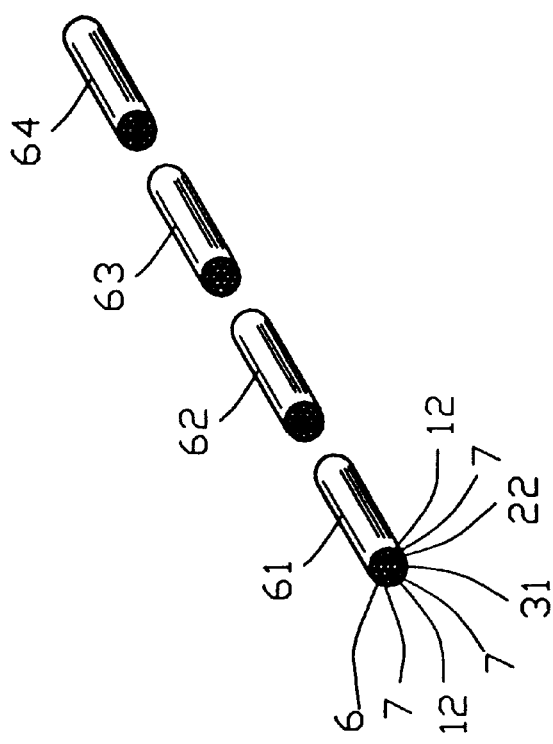
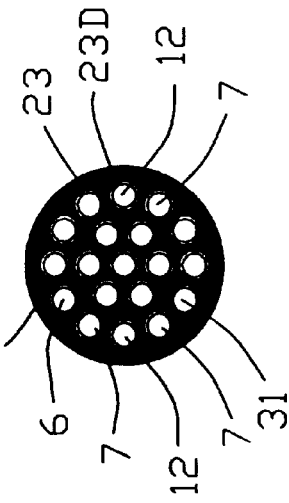
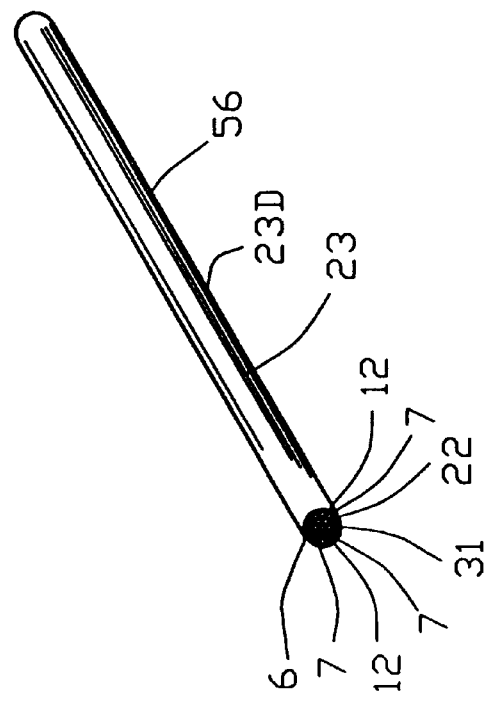
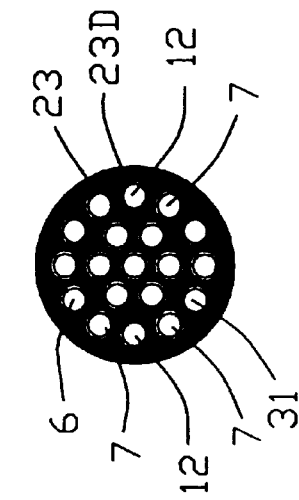

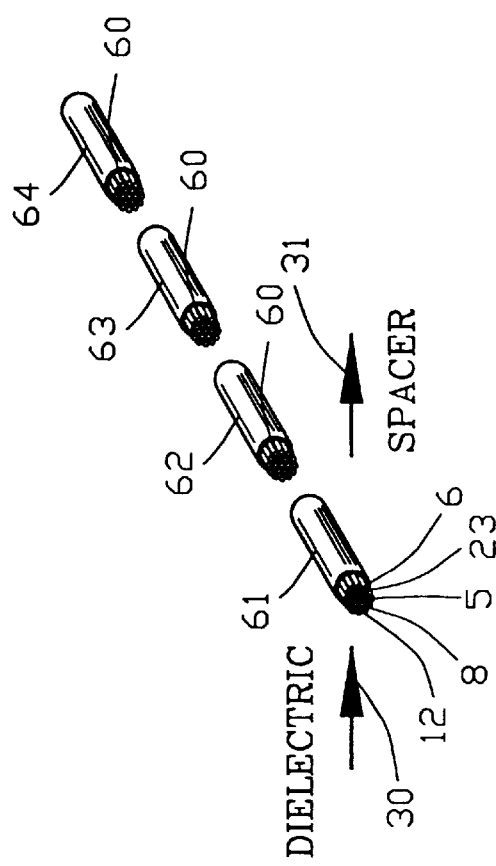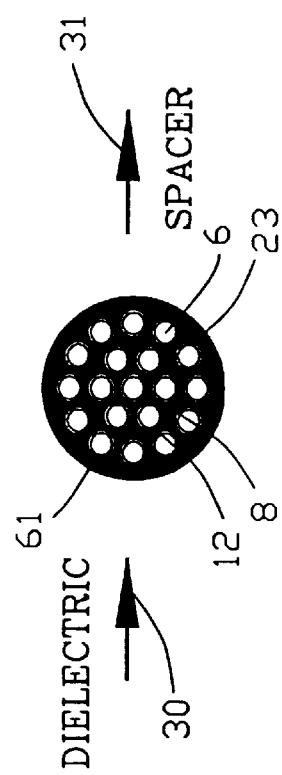
FIG. 13  FIG. 13A
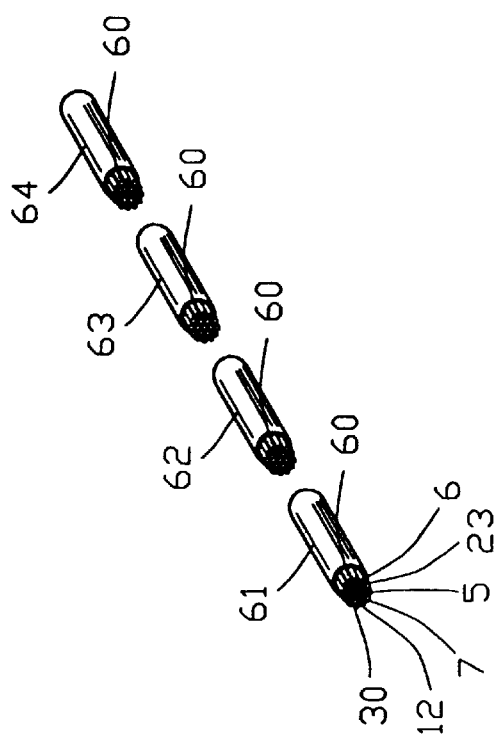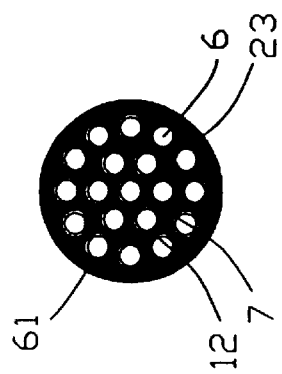
FIG. 12  FIG. 12A

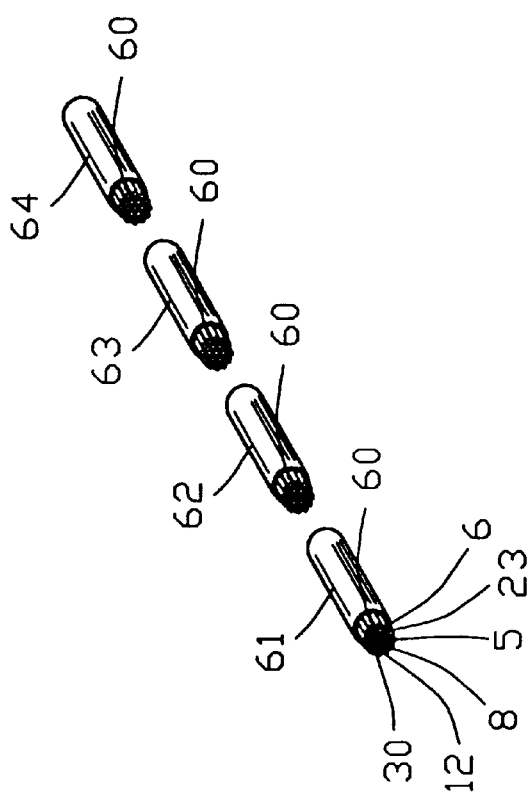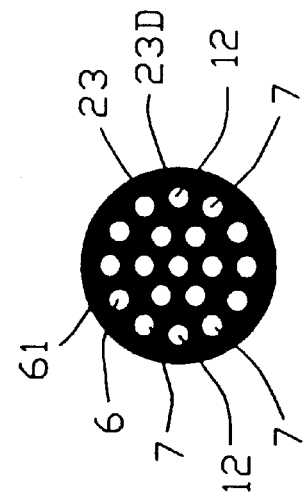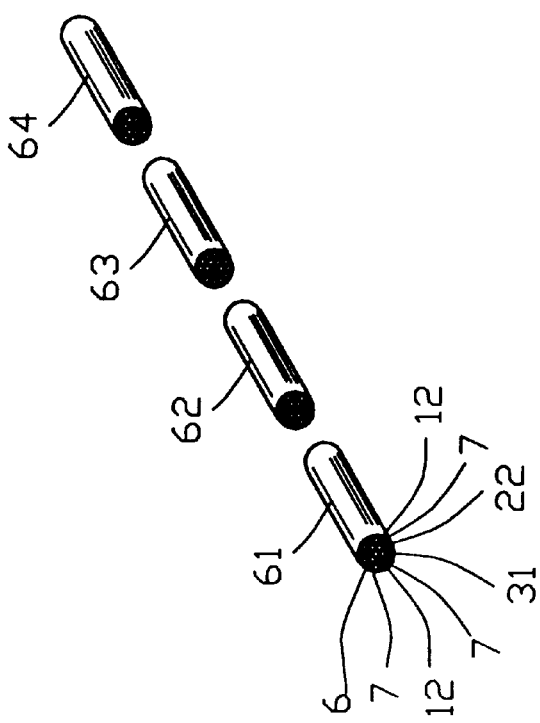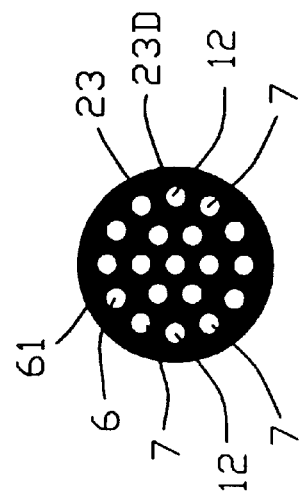

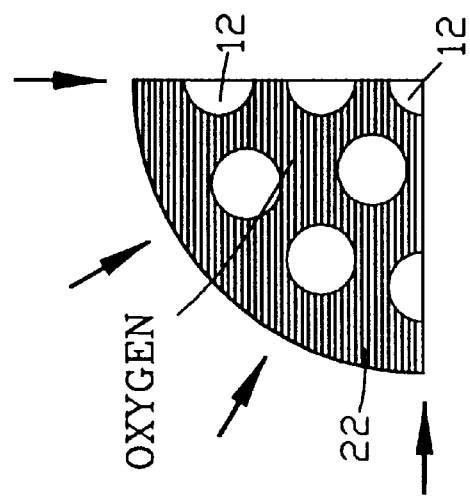
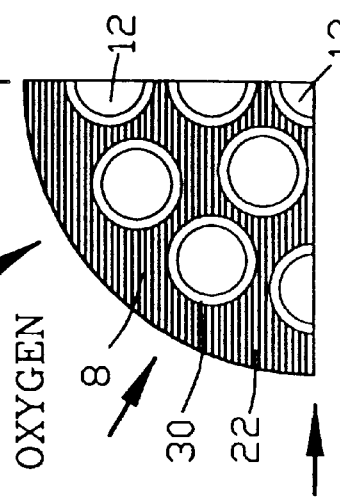
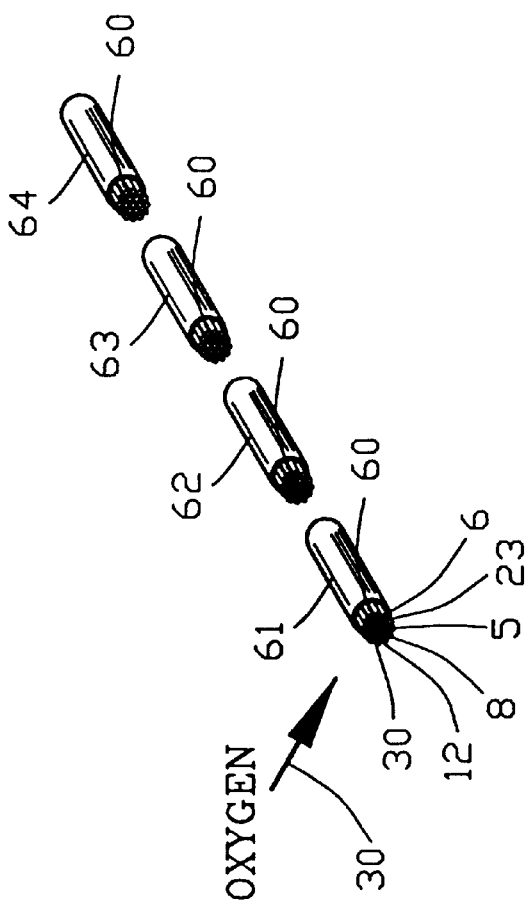
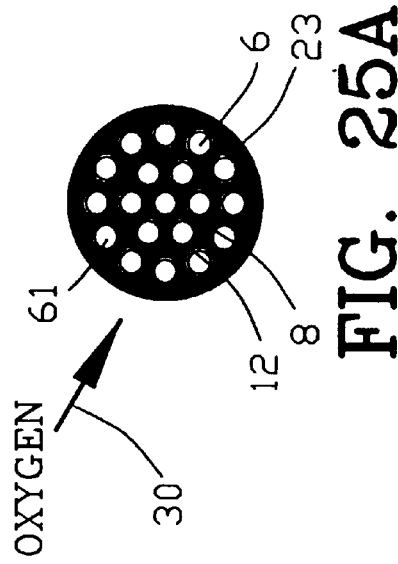

CAPACITOR

CROSS-REFERENCE TO RELATED APPLICATIONS

This application claims benefit of U.S. patent Provisional application Ser. No. 60/049,139 filed Jun. 10, 1997. All subject matter set forth in provisional application Ser. No. 60/049,139 is hereby incorporated by reference into the present application as if fully set forth herein.

This application is a divisional of application Ser. No. 09/094,395 filed Jun. 9, 1998, now U.S. Pat. No. 6,946,091 the disclosure of which is incorporated herein by reference.

BACKGROUND OF THE INVENTION

1. Field of the Invention

This invention relates to capacitors for electrical and electronic circuits, and more particularly to an improved metallic capacitor having a high capacitance and low physical volume. This invention also relates to the method of making the improved metallic capacitor through a wire drawing process.

2. Background of the Invention

Over the years, the size of electronic components has decreased steadily and dramatically in the electrical and electronic art. Along with such dramatic decrease in the size of electrical components, the speed and complexity of electronic components has increased substantially in the electrical and electronic art. The decrease in size of electronic components has been primarily within the areas of semiconductors and resistant elements. However, such dramatic decreases in size have not been effected in the area of electrical connectors.

A capacitor is formed by two conductive plates separated by a dielectric interposed between the two conductive plates. The capacitance of a capacitor is directly proportional to the area of the conductive plates of the capacitor and is inversely proportional to the separation of the conductive plates or the thickness of the dielectric. The dielectric of a capacitor must be of sufficient thickness to withstand the voltage potential between the conductive capacitor plates while being sufficiently thin to increase the capacitance of the capacitor.

It should be understood that any reduction in size of a capacitor is limited by the physical configurations of the capacitor namely the total surface area of the conductive capacitor plates and the thickness of the dielectric insulator between the conductive plates of the capacitor. Accordingly, in order to decrease the physical dimensions of the capacitor while remaining the same capacitance, any reduction in the total surface area of the conductive capacitor plates must be associated with the corresponding reduction in the thickness of the dielectric material or the spacing between the conductive capacitor plates.

Traditionally, prior art capacitors were formed by rolling a first and second foil separated by a dielectric material into a cylindrical roll. Some in the prior art have attempted to miniaturize capacitors by incorporating thin film sheet technology and the like. By utilizing thin film sheet technology, the physical thickness of the conductive capacitor plates is reduced, without reducing the surface area thereof. The use of thin film technology aided in the physical reduction of the physical size of the capacitor for a given capacitance.

Accordingly, it is an object of the present invention to provide an apparatus and method of making a capacitor having an extremely high capacitance for physical size which was heretofore unknown by the prior art.

Another object of this invention is to provide an apparatus and method of making a capacitor which is extremely reliable and capable of high temperature operation.

Another object of this invention is to provide an apparatus and method of making a capacitor which utilizes a plurality of coaxial capacitors connected in electrical parallel.

Another object of this invention is to provide an apparatus and method of making a capacitor wherein each of the individual coaxial capacitors may be tested for any defects prior to interconnection thereby eliminating the need for scrapping the capacitor due to a single defective one of a plurality of coaxial capacitors.

Another object of this invention is to provide an apparatus and method of making a capacitor by drawing coaxial conductors separated by a dielectric material in a wire drawing process.

Another object of this invention is to provide an apparatus and method of making a capacitor by drawing a multiplicity of individual coaxial capacitors in a wire drawing process.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description presenting the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved capacitor, comprising an array of a multiplicity of capacitor elements. Each of said multiplicity of said capacitor elements comprises a first capacitor plate element surrounded by a second capacitor plate element with a dielectric material interposed therebetween. A first capacitor plate connector interconnects each of the first capacitor plate elements of the multiplicity of the capacitor elements to form a first capacitor plate. A second capacitor plate connector interconnects each of the second capacitor plate elements of the multiplicity of the capacitor elements to form a second capacitor plate.

In one embodiment of the invention, the first capacitor plate elements includes a metallic wire having a substantially circular cross-section. The dielectric material may include an oxide on each of the first capacitor plate elements or may include a coating on each of the first capacitor plate elements.

In another embodiment of the invention, each of the second capacitor plate elements includes a metallic tube in the form of a continuous metallic tube about each of the first capacitor plate elements and the dielectric materials. The first capacitor plate connector includes each of the first capacitor plate elements having an exposed portion. The first capacitor plate connector interconnects each of the exposed portions of each of the multiplicity of the first capacitor elements to form the first capacitor plate. The second capacitor plate connector includes the multiplicity of the capacitor elements being disposed within a second metallic tube and being in electrical contact therewith.

The invention is also incorporated into the process for making a capacitor, comprising the steps providing a first capacitor plate element. The first capacitor plate element is covered with a spacing material selected for forming a capacitor dielectric. The first capacitor plate element and the spacing material are encased with a second capacitor plate element. A multiplicity of the capacitor elements are inserted within a second capacitor plate connector. The second capacitor plate connector is drawing for reducing the outer diameter thereof and for electrically interconnecting the multiplicity of the second capacitor plate elements with the second capacitor plate connector to form a second capacitor plate. The multiplicity of the first capacitor elements are interconnected with a first capacitor plate connector to form a first capacitor plate.

In a more specific embodiment of the invention, the step of covering the first capacitor plate element with the spacing material selected for forming a capacitor dielectric includes chemically replacing the spacing material with a dielectric material. Preferably, the first and second capacitor plate elements with the spacing material therebetween are immersed within an acid for removing the spacing material from between the first and second capacitor plate elements. Thereafter, a dielectric material is formed between each of the first and second capacitor plate elements.

In a more specific embodiment of the invention, the capacitor plate element is a metallic wire having a substantially circular cross-section. In one embodiment of the invention, the second capacitor element is a first metallic tube such as a preformed first metallic tube or a continuous tube formed about the first capacitor plate element and the spacing material. When the second capacitor plate element is drawn, the first capacitor plate element and the second capacitor plate element are moved into engagement with opposed sides of the spacing material.

Preferably, a multiplicity of the capacitor elements are formed into an array. The array of the capacitor elements are simultaneously encased within the second capacitor plate connector. Preferably, the second capacitor plate connector is a second metallic tube such as a preformed second metallic tube or a continuous tube formed about the array of the capacitor elements.

The step of drawing the second capacitor plate connector electrically interconnects the multiplicity of the second capacitor plate elements with the second capacitor plate connector by diffusion welding the second capacitor plate elements to the second capacitor plate connector to form a substantially unitary material.

The multiplicity of the first capacitor elements are interconnected with a first capacitor plate connector to form a first capacitor plate. Preferably, a portion of each of the first capacitor plate elements of the array of capacitor elements are exposed for connection to the first capacitor plate connector.

A portion of each of the first capacitor plate elements of the array of capacitor elements may be exposed by chemically removing a portion of the second capacitor plate elements and the second capacitor plate connector. The exposed portion of each of the multiplicity of the first capacitor plate elements are interconnected with the first capacitor plate connector.

In one embodiment of the invention, the second capacitor plate elements and the second capacitor plate connector are immersed into an acid for dissolving a portion of the second capacitor plate elements and the second capacitor plate connector and for exposing a portion of each of the first capacitor plate elements of the array of capacitor elements. The exposed portion of each of the multiplicity of the first capacitor elements are interconnected with the first capacitor plate connector.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated that the conception and the specific embodiments disclosed may be readily utilized as a basis for modifying or designing other structures for carrying out the same purposes of the present invention. It also should be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 4 is an isometric view of a first capacitor plate element shown as a wire referred to in FIG. 3;

FIG. 4A is an end view of FIG. 4;

FIG. 5 is an isometric view of a spacing material encasing the first capacitor plate element of FIG. 4;

FIG. 5A is an end view of FIG. 5;

FIG. 6 is an isometric view of the first capacitor plate element and the spacer material encased within a second capacitor plate element;

FIG. 6A is an end view of FIG. 6;

FIG. 7 is an isometric view after drawing the second capacitor plate element with the first capacitor plate element and the spacing material to form a capacitor element;

FIG. 7A is an enlarged end view of FIG. 7;

FIG. 8 is an isometric view of assembling a multiplicity of the coaxial elements into a parallel array;

FIG. 8A is an end view of FIG. 8;

FIG. 9 is an isometric view of a second capacitor plate connector encasing the parallel array of the coaxial elements;

FIG. 9A is an end view of FIG. 9;

FIG. 10 is an isometric view after drawing the second capacitor plate connector with the parallel array of the coaxial elements therein for electrically interconnecting the second plate elements with the second capacitor plate connector to form a second capacitor plate;

FIG. 10A is an enlarged end view of FIG. 10;

FIG. 11 is an isometric view after severing the parallel array of the coaxial elements of FIG. 10 into a plurality of segments;

FIG. 11A is an enlarged end view of FIG. 11;

FIG. 12 is an isometric view after exposing a portion of each of the first capacitor plate elements of the parallel array of the capacitor elements;

FIG. 12A is an enlarged end view of FIG. 12;

FIG. 13 is an isometric view illustrating the process of replacing the spacing material with a dielectric material to form a parallel array of the capacitor elements;

FIG. 13A is an enlarged end view of FIG. 13;

FIG. 23 is an isometric view after severing the parallel array of the coaxial elements of FIG. 22 into a plurality of segments;

FIG. 23A is an enlarged end view of FIG. 23;

FIG. 24 is an isometric view after exposing a portion of each of the first capacitor plate elements of the parallel array of the capacitor elements;

FIG. 24A is an enlarged end view of FIG. 24;

FIG. 25 is an isometric view illustrating the process of forming dielectric materials to create a parallel array of the capacitor elements;

FIG. 25A is an enlarged end view of FIG. 25;

FIG. 26 is a magnified view of a portion of FIG. 25A prior to the formation of the dielectric materials; and FIG. 26A is a magnified view of similar to FIG. 26 after the formation of the dielectric materials.

Similar reference characters refer to similar parts throughout the several Figures of the drawings.

DETAILED DISCUSSION

Figure 2:
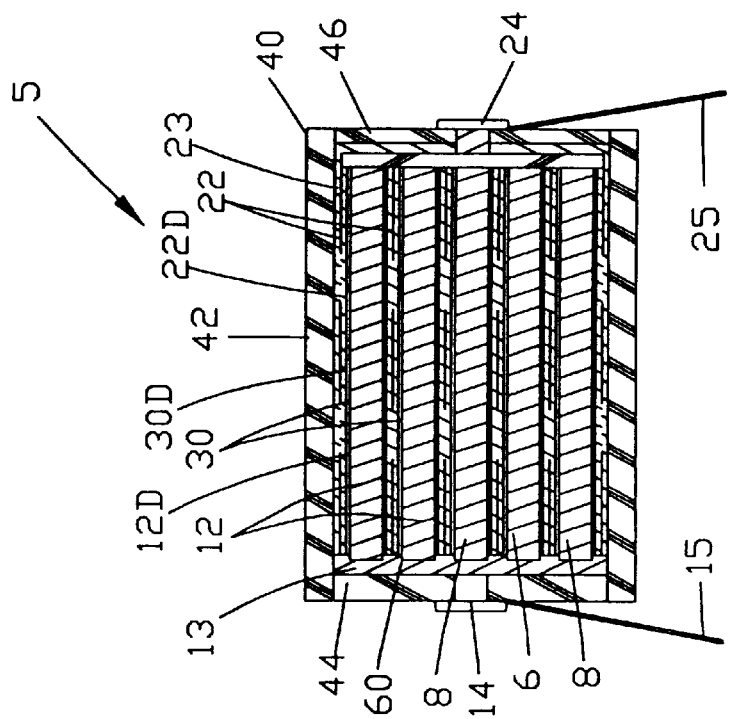
FIG. 2 is a sectional view of the capacitor of FIG. 1.
Figure 1:
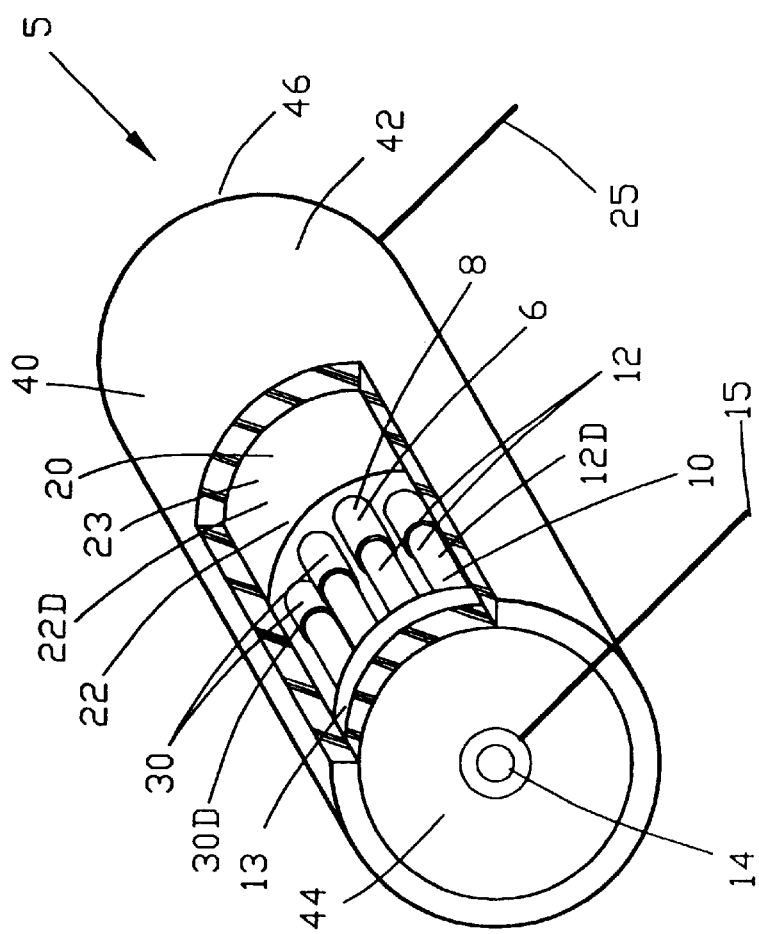
FIG. 1 is an isometric view of a capacitor of the present invention.

FIG. 1 is an isometric view of a capacitor 5 of the present invention with FIG. 2 being a sectional view of the capacitor 5 of FIG. 1. The capacitor 5 comprises an array 6 of coaxial capacitor elements 8 shown as a physically oriented parallel array interconnected in dielectric parallel.

The capacitor 5 comprises a first capacitor plate 10 and a second capacitor plate 20 separated by a dielectric 30. The first capacitor plate 10 comprises a multiplicity of first capacitor elements 12 with each of the multiplicity of first capacitor elements 12 being shown as a wire having an outer diameter 12D.

The second capacitor plate 20 comprises a multiplicity of second capacitor elements 22 encompassing the multiplicity of first capacitor elements 12. A multiplicity of dielectric materials 30 are interposed between each of the multiplicity of first capacitor elements 12 and the multiplicity of second capacitor elements 22.

As best shown in FIG. 2, each of the second capacitor elements 22 defines an outer diameter 22D whereas each of the multiplicity of dielectric materials 30 define an outer diameter 30D.

The multiplicity of first capacitor elements 12 are connected by a first plate connector 13 to form the first capacitor plate 10. The first plate connector 13 interconnects the multiplicity of first capacitor elements 12 in electrical parallel. The first capacitor plate 10 is connected through a first wire connector 14 to a first connection wire 15.

The multiplicity of the second capacitor elements 22 are connected by a second plate connector 23 to form the second capacitor plate 20. The second plate connector 23 interconnects the multiplicity of the second capacitor elements 22 in electrical parallel. The second capacitor plate 20 is connected through a second wire connector 24 to a first connection wire 25.

The capacitor 5 is encapsulated with an insulating covering 40 for insulating the first and second capacitor plates 10 and 20 from the ambient. The insulating covering 40 comprises an outer insulator 42 and end insulators 44 and 46.

The capacitor 5 has been shown with only a small number of coaxial capacitor elements 8 within the array 6 for the sake of clarity. Preferably, 500 to 1000 coaxial capacitor elements 8 are contained within the array 6 when the capacitor 5 of FIGS. 1 and 2 are constructed in accordance with the process of the present invention.

Figure 3:
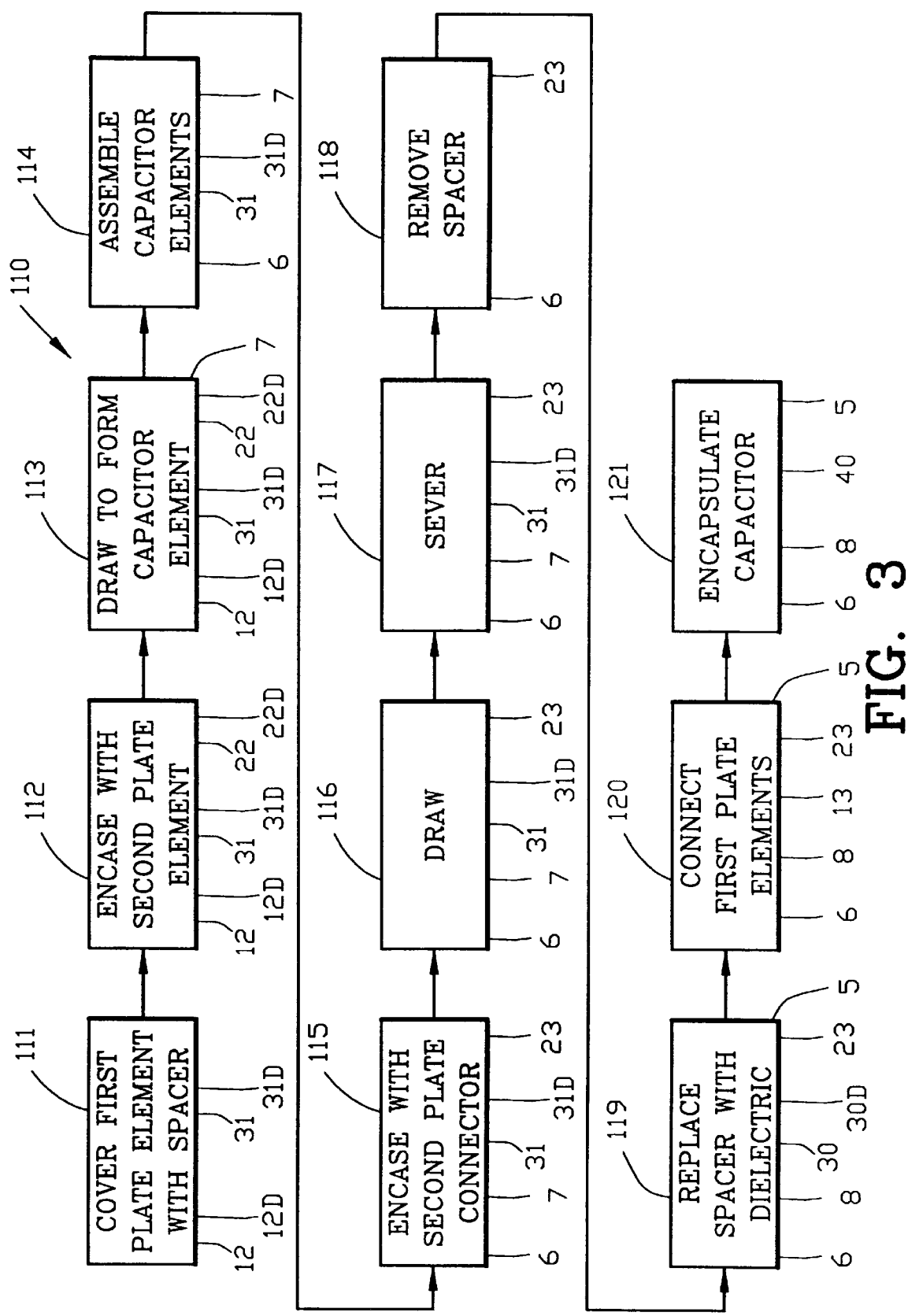
FIG. 3 is a block diagram illustrating a first improved method of making a capacitor.

FIG. 3 is a block diagram illustrating a first process 110 for making a capacitor. The improved process 110 of FIG. 3 comprises the provision of the first capacitor plate element 12. FIG. 4 is an isometric view of the first capacitor plate element 12 referred to in FIG. 3 with FIG. 4A being an end view of FIG. 4. Preferably, the first capacitor plate element 12 is in the form of a metallic wire having a substantially circular cross-section defined by the outer diameter 12D.

FIG. 3 illustrates the process step 111 of covering the first capacitor plate element 12 with a spacer material 31. FIG. 5 is an isometric view of the spacer material 31 encasing the first capacitor plate element 12 of FIG. 4 with FIG. 5A being an end view of FIG. 5. The spacer material 31 encircles the first capacitor plate element 12 to have a substantially circular cross-section defined by the outer diameter 31D.

The processing of covering the first capacitor plate element 12 with the space material 31 may be accomplished in various ways depending upon the desired physical and electrical characteristics of the capacitor 5. In one example of the invention, the process of covering the first capacitor plate element 12 with the spacer material 31 includes inserting the first capacitor plate element 12 within a preformed tube 26 made from spacer material 31. In the alternative, the process of covering the first capacitor plate element 12 with the spacer material 31 may includes bending a longitudinally extending sheet of the spacer material about the first capacitor plate element 12. In another example of the invention, the process of covering the first capacitor plate element 12 with the spacer material 31 includes coating the first capacitor plate element 12 with the spacer material 31. The first capacitor plate element 12 may be coated with a flowable spacer material 30 that cures onto the first capacitor plate element 12. The spacer material 31 is applied to the first capacitor plate element 12 to a thickness of 0.005 cm to 0.05 cm to define an outer diameter 31D. Preferably, the spacer material of high ductility and chemically different from the first capacitor plate element 12.

FIG. 3 illustrates the process step 112 of encasing the first capacitor plate element 12 and the spacer material 31 thereon with the second capacitor plate element 22. FIG. 6 is an isometric view of the first capacitor plate element 12 and the spacer material 31 encased within the second capacitor plate element 22 with FIG. 6A being an end view of FIG. 6. The second capacitor plate element 22 is defined by a preformed tube 26. The second capacitor plate element 22 encircles the first capacitor plate element 12 and the spacer material 31 to have a substantially circular cross-section defined by the outer diameter 22D. Preferably, the second capacitor plate element 22 is in the form of a continuous metal tube having different chemical properties than the first capacitor plate element 12. The step of encasing the first capacitor plate element 12 and the spacer material 31 within the second capacitor plate element 22 includes inserting the first capacitor plate element 12 and the spacer material 31 within the second capacitor plate element 22.

In the alternative, the second capacitor plate element 22 may be a longitudinally extending sheet formed about the first capacitor plate element 12 and the spacer material 31 to have a substantially circular cross-section. In this alternative, the first capacitor plate element 22 with the spacer material 31 thereon is encased by bending the longitudinally extending sheet of the second capacitor plate element 22 about the first capacitor plate element 12 and the spacer material 31. Preferably, the second capacitor plate element 22 is in the form of a continuous metal tube having different chemical properties than the spacer material 31.

FIG. 3 illustrates the process step 113 of drawing the second capacitor plate element 22 with first capacitor plate element 12 and the spacer material 31 therein for reducing the outer diameter 22D thereof and for forming a coaxial element 7 thereby.

FIG. 7 is an isometric view after drawing the second capacitor plate element 22 with the first capacitor plate element 12 and the spacer material 31. FIG. 7A is an enlarged end view of FIG. 7. Preferably, the process step 113 of drawing the second capacitor plate element 22 includes the successive drawing and annealing of the second capacitor plate element 22 with the first capacitor plate element 12 and the spacer material 31 therein for reducing the outer diameter 7D. The drawing the second capacitor plate element 22 moves the first capacitor plate element 12 and the second capacitor plate element 22 into engagement with opposed sides of the spacer material 31 and to form the coaxial element 7 thereby.

FIG. 3 illustrates the process step 114 of assembling the array 6 formed from a multiplicity of coaxial elements 7 in a substantially parallel configuration. FIG. 8 is an isometric view of a multiplicity of the coaxial elements 7 assembled into the parallel array 6 with FIG. 8A being an end view of FIG. 8. Preferably, 500 to 1000 of the coaxial elements 7 are arranged in a substantially parallel configuration to form the parallel array 6.

FIG. 3 illustrates the process step 115 of encasing the parallel array 6 of the multiplicity of coaxial elements 7 within the second capacitor plate connector 23. FIG. 9 is an isometric view of the second capacitor plate connector 23 encasing the parallel array 6 of coaxial elements 7 with FIG. 9A being an end view of FIG. 9. Preferably, the second capacitor plate connector 23 is in the form of a continuous metal tube 56 having the same chemically properties as the second capacitor plate element 22.

The second capacitor plate connector 23 encircles the array 6 to have a substantially circular cross-section defined by an outer diameter 23D. Preferably, the step of encasing the array 6 of the multiplicity of the coaxial elements 7 within the second capacitor plate connector 23 includes simultaneously inserting the array 6 of the multiplicity of the coaxial elements 7 within a preformed second metallic tube.

In the alternative, the second capacitor plate connector 23 may be a longitudinally extending sheet formed about the array 6 of the multiplicity of the coaxial elements 7 to have a substantially circular cross-section. In this alternative, the array 6 of the multiplicity of the coaxial elements 7 is encased by bending the longitudinally extending sheet of the second capacitor plate connector 23 about the array 6 of the multiplicity of the coaxial elements 7.

FIG. 3 illustrates the process step 116 of drawing the second capacitor plate connector 23 with the parallel array 6 of the coaxial elements 7 therein. FIG. 10 is an isometric view after drawing the second capacitor plate connector 23 with the parallel array 6 of the coaxial elements 7 therein for electrically interconnecting the second capacitor plate elements 22 with the second capacitor plate connector 23 to form the second capacitor plate 20. FIG. 10A is an enlarged end view of FIG. 10. The drawing the second capacitor plate connector 23 with the parallel array 6 of the multiplicity of the coaxial elements 7 therein reduces the outer diameter 23D of the second capacitor plate connector 23 and electrically interconnects the multiplicity of the second capacitor plate elements 22 with the second capacitor plate connector 23 to form the second capacitor plate 20.

The process step 116 of drawing the second capacitor plate connector 23 with the parallel array 6 of the coaxial elements 7 therein provides three effects. Firstly, the process step 116 reduces an outer diameter 23D of the second capacitor plate connector 23. Secondly, the process step 116 reduces the corresponding outer diameter 23D of each of the coaxial elements 7 and the corresponding thickness of the spacer material 31. Thirdly, the process step 116 causes the second capacitor plate elements 22 to diffusion weld with adjacent second capacitor plate elements 22 and to diffusion weld with the second capacitor plate connector 23 to form the second capacitor plate 20.

The diffusion welding of the second capacitor plate elements 22 to adjacent second capacitor plate elements 22 and with the second capacitor plate connector 23 forms a unitary second capacitor plate 20. The multiplicity of the first capacitor elements 12 surrounded by the spacer material 31 are contained within the unitary second capacitor plate 20.

FIG. 3 illustrates the process step 117 of severing the parallel array 6 of the coaxial elements 7. FIG. 11 is an isometric view after severing the parallel array 6 of the coaxial elements 7 of FIG. 10 into a plurality of segments 61–64. FIG. 13A is an enlarged end view of FIG. 13.

The parallel array 6 of the coaxial elements 7 is severed into segments having a length for enabling the removal and/or the replacement of the spacer material 31. More specifically, the coaxial elements 7 are severed into segments having a length sufficiently small for enabling the complete removal and/or the replacement of the spacer material 31 while being sufficiently long to obtain the desire capacitance of the capacitor 5. In one example of the invention, the coaxial elements 7 are severed into segments having a length of 1 cm. The process step 117 may include the step of exposing a portion of each of the first capacitor plate elements 12 of the parallel array 6 of coaxial capacitor elements 8.

FIG. 12 is an isometric view after exposing the portion 60 of each of the first capacitor plate elements 12 of the parallel array 6 of the coaxial capacitor elements 8. FIG. 12A is an enlarged end view of FIG. 12. In one process of the present invention, the process of exposing the portion 60 of each of the first capacitor plate elements 12 of the parallel array 6 of the coaxial elements 7 include chemically removing a portion of the second capacitor plate elements 22 and a portion of the second capacitor plate connector 23. Preferably, the second capacitor plate elements 22 and the second capacitor plate connector 23 are immersed into an acid for dissolving a portion of the second capacitor plate elements 22 and a portion of the second capacitor plate connector 23.

The second capacitor plate connector 23 has the same chemical properties as the second capacitor plate element 22. Since, the second capacitor plate element 22 and the second capacitor plate connector 23 have different chemically properties than the first capacitor plate element 12, a portion of the second capacitor plate elements 22 and a portion of the second capacitor plate connector 23 may be chemically removed without removal of the first capacitor plate element 12.

FIG. 3 illustrates the process step 118 of removing the spacer material 31 and the process step 119 of replacing the spacer material 31 with the dielectric material 30. FIG. 13 is an isometric view illustrating the combined processes 118 and 119 of removing the spacer material 31 and replacing the spacer material 31 with the dielectric material 30. FIG. 13A is an enlarged end view of FIG. 13.

The spacer material 31 spaces each of the second capacitor plate elements 22 from each of the first capacitor plate elements 12 in each of the coaxial elements 7. When the spacer material 31 is replaced by the dielectric material 30, the dielectric material 30 spaces each of the second capacitor plate elements 22 from each of the first capacitor plate elements 12 to form each of the capacitor elements 8 thereby. When the spacer material 31 is replaced by the dielectric material 30, the parallel array 6 of coaxial elements 7 is transformed into a parallel array 6 of capacitor element 8.

The spacer material 31 may be removed and replaced by the dielectric material 30 in two separate and distinct process or may be combined within a single process. Preferably, the spacer material 31 is removed and replaced by the dielectric material 30 in a chemical or an electrochemical process. In one embodiment of the invention, the spacer material 31 is a metallic material selected to be dissolved by an acid to remove the spacer material 31. Thereafter, a chemical compound such as an oxide may be formed on one of the first and second capacitor plate elements 12 and 22 to form the dielectric material 30.

In one example of the invention, the first capacitor element 12 is made from titanium with the spacer material 31 being formed from a copper material coated on the first capacitor element 12. The second capacitor plate element 22 is made of an aluminum material. The copper spacer material 31 is dissolved in an aluminum anodizing bath by making coaxial element 7 an anode in the anodizing bath. During the aluminum anodizing process, the copper spacer material 31 is plated onto a stainless steel cathode. The copper spacer material 31 is dissolved in the anodizing bath while an aluminum oxide is formed on the aluminum second capacitor plate element 22 to form the dielectric material 30.

FIG. 3 illustrates the process step 120 of interconnecting the multiplicity of the first capacitor elements 12 with the first capacitor plate connector 13 to form the first capacitor plate 10. In one example of the invention, the step of interconnecting the multiplicity of the first capacitor elements 12 with the first capacitor plate connector 13 to form the first capacitor plate 10 includes interconnecting the exposed portions 60 of each of the first capacitor plate elements 12 of the parallel array 6 of coaxial capacitor elements 8.

Figure 14:
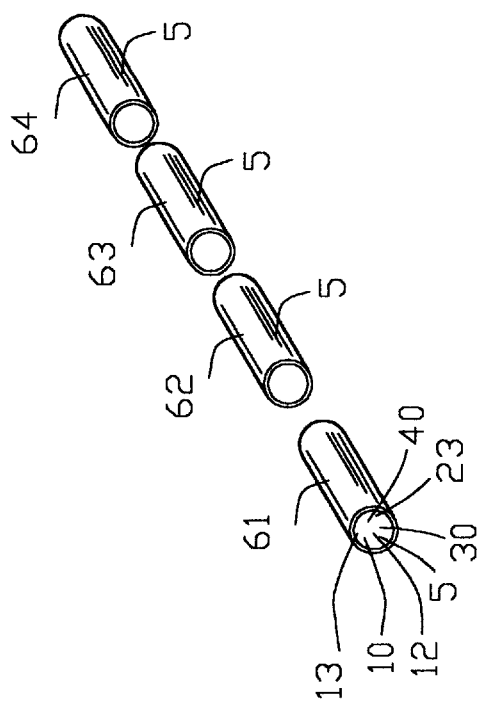
FIG. 14 is an isometric view interconnecting the multiplicity of the first capacitor elements with a first capacitor plate connector to form a first capacitor plate.
Figure 14A:
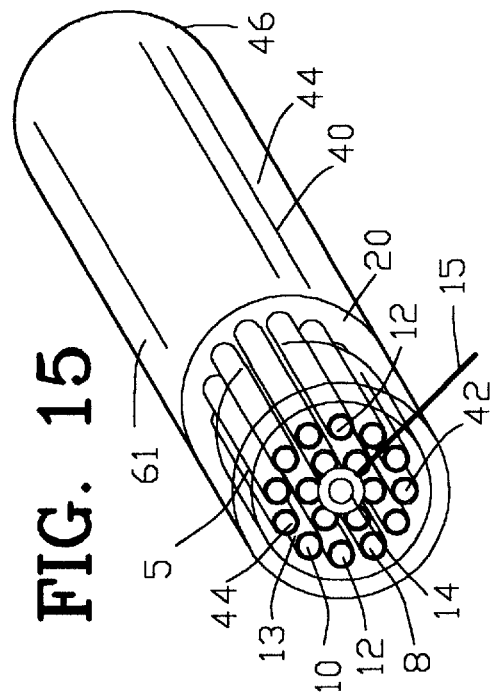
FIG. 14A is an enlarged end view of FIG. 14.

FIG. 14 is an isometric view illustrating the interconnection of the multiplicity of the first capacitor elements 12 with the first capacitor plate connector 13 to form a first capacitor plate 10. FIG. 14A is an enlarged view of FIG. 14. In one example of the present invention, the exposed portions 60 of each of the multiplicity of the first capacitor elements 12 is interconnected with the first capacitor plate connector 13 by a soldering process. The first capacitor plate 10 is connected through the first wire capacitor 14 to the first connection wire 15. In the alternative, the exposed portions 60 of each of the multiplicity of the first capacitor elements 12 is interconnected with the first capacitor plate connector 13 by a welding process.

Figure 15:
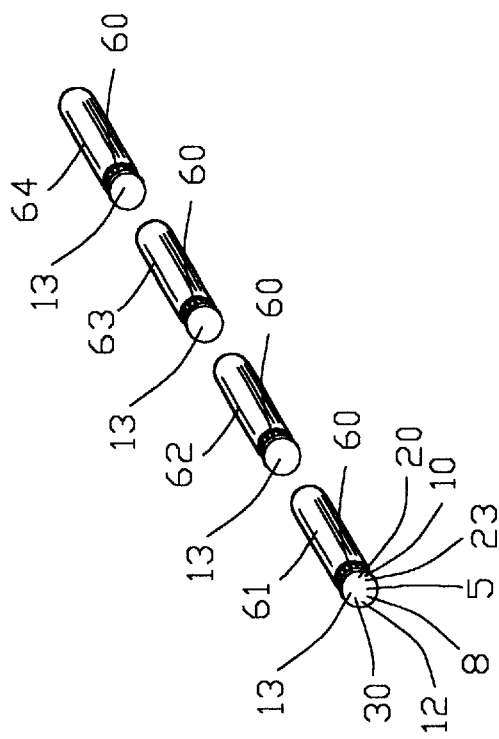
FIG. 15 is an isometric view after packaging the capacitor of FIG. 14.
Figure 15A:
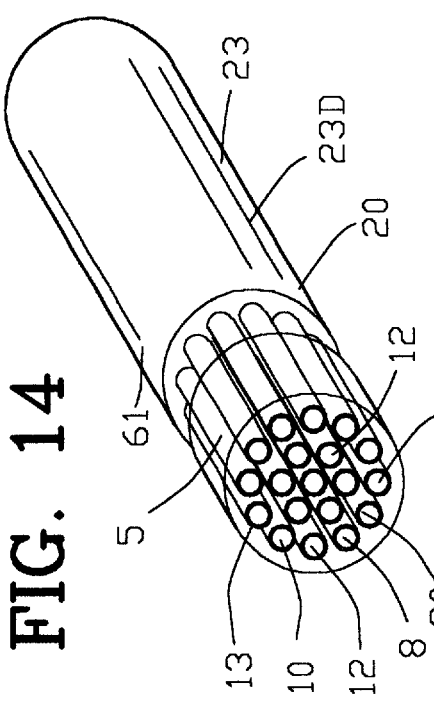
FIG. 15A is an enlarged end view of FIG. 15.

FIG. 3 illustrates the process step 121 of encapsulating the capacitor 5 of FIGS. 14 and 14A with the insulation covering 40. FIG. 15 is an isometric view the insulation covering 40 the capacitor 5 of FIG. 14 with FIG. 15A being an enlarged view of FIG. 15. The insulating covering 40 comprises an outer insulator 42 and end insulators 44 and 46. In the alternative, the insulating covering 40 may be a unitary insulation applied by a potting process or the like.

EXAMPLE 1

| first capacitor plate element (12) | |
|---|---|
| material | Titanium |
| initial diameter | 0.25 cm |
| final diameter | 0.025 cm |
| second capacitor plate element (22) | |
| material | aluminum |
| wall thickness | 0.07 cm |
| initial diameter | 0.4 cm |
| final diameter | 0.025 cm |
| second capacitor plate connector (23) | |
| material | aluminum |
| wall thickness | 0.07 cm |
| initial diameter | 0.4 cm |
| final diameter | 0.025 cm |
| spacer | |
| material | copper |
| thickness | 0.0002 cm |
| insulator (30) | |
| material | aluminum oxide |
| thickness | 0.000001 cm |
| Capacitor (5) | |
| final physical dimensions | 0.025 cm × 1 cm |
| number of coaxial capacitors | 300 |
| capacitance | 1.1 µF |

Figure 16:
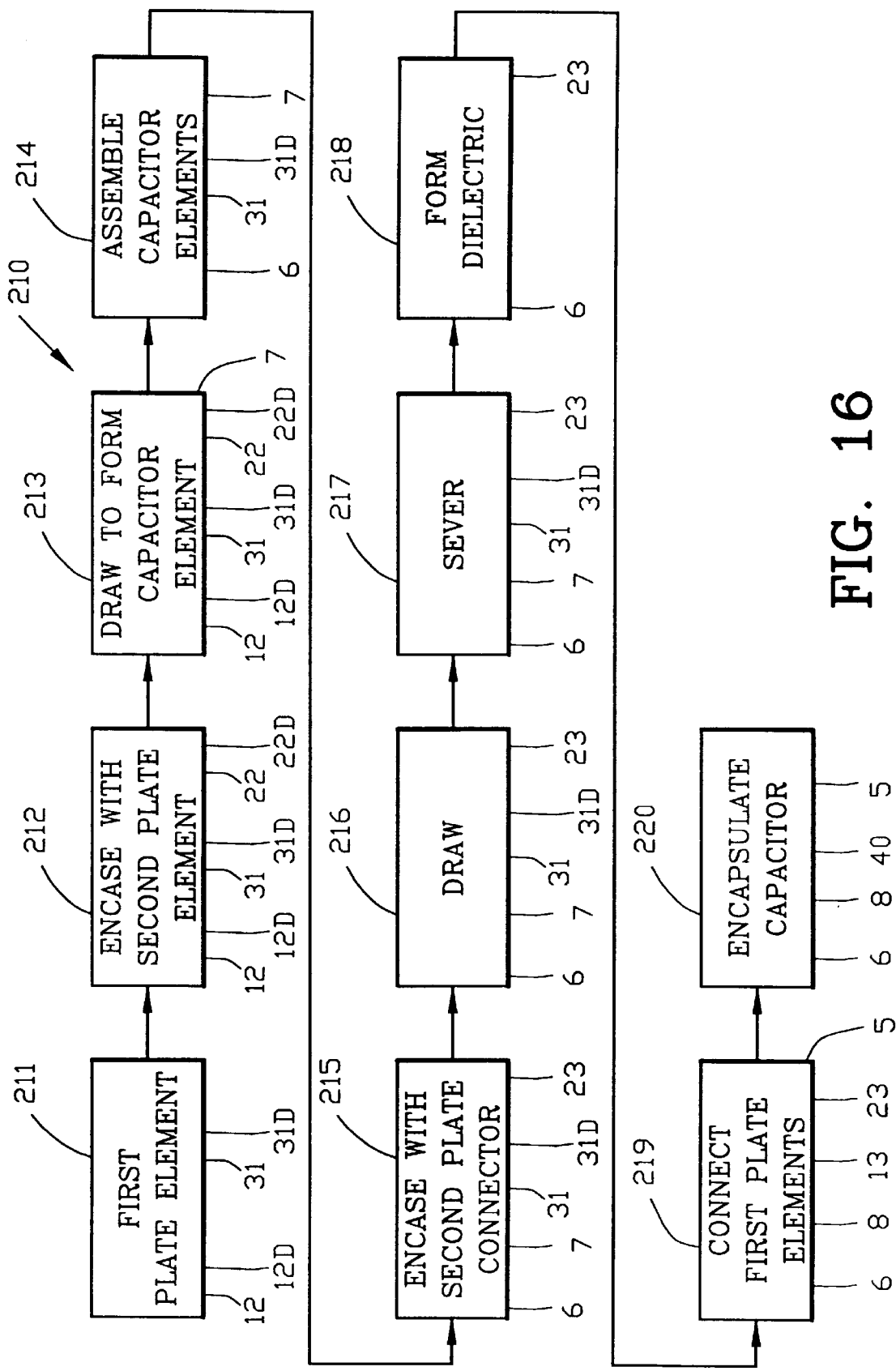
FIG. 16 is a block diagram illustrating a second improved method of making a capacitor.
Figure 17:
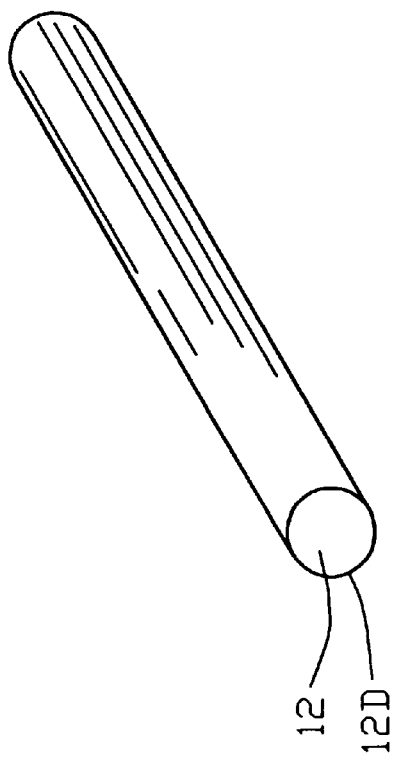
FIG. 17 is an isometric view of a first capacitor plate element shown as a wire referred to in FIG. 16.
Figure 17A:
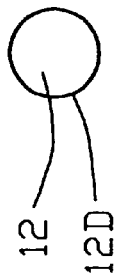
FIG. 17A is an end view of FIG. 17.

FIG. 16 is a block diagram illustrating a second process 210 for making a capacitor. The improved process 210 of FIG. 16 comprises the process step 211 of the provision of the first capacitor plate element 12. FIG. 17 is an isometric view of the first capacitor plate element 12 referred to in FIG. 16 with FIG. 17A being an end view of FIG. 17. Preferably, the first capacitor plate element 12 is in the form of a metallic wire having a substantially circular cross-section defined by the outer diameter 12D.

Figure 18:
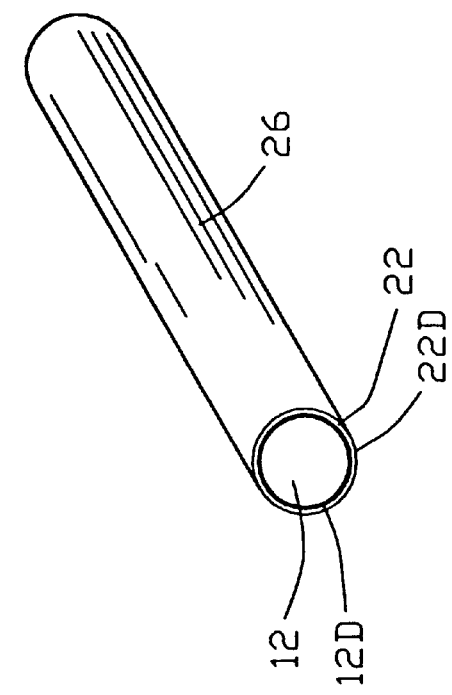
FIG. 18 is an isometric view of a second capacitor plate element encasing the first capacitor plate element.
Figure 18A:
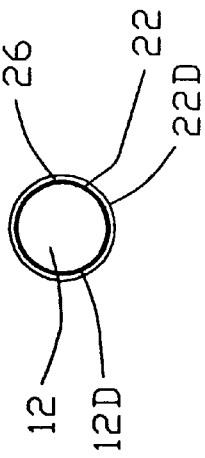
FIG. 18A is an end view of FIG. 18.

FIG. 16 illustrates the process step 212 of encasing the first capacitor plate element 12 within the second capacitor plate element 22. FIG. 18 is an isomeric view of the second capacitor plate element 22 encasing the first capacitor plate element 12 with FIG. 18A being an end view of FIG. 18. The second capacitor plate element 22 is defined by a preformed tube 26. The second capacitor plate element 22 encircles the first capacitor plate element 12 to have a substantially circular cross-section defined by the outer diameter 22D. Preferably, the second capacitor plate element 22 is in the form of a continuous metal tube having different chemical properties than the first capacitor plate element 12. The step of encasing the first capacitor plate element 12 within the second capacitor plate element 22 includes inserting the first capacitor plate element 12 within the second capacitor plate element 22.

In the alternative, the second capacitor plate element 22 may be a longitudinally extending sheet formed about the first capacitor plate element 12 to have a substantially circular cross-section. In this alternative, the first capacitor plate element 12 is encased by bending the longitudinally extending sheet of the second capacitor plate element 22 about the first capacitor plate element 12. Preferably, the second capacitor plate element 22 is in the form of a continuous metal tube having a chemical properties different from the chemical properties of the first capacitor plate element 12.

A second important aspect of this embodiment of the present invention is selection of the first capacitor plate 12 to be reactive with the permeating gas to form a dielectric 30. A second important aspect of this embodiment of the present invention is selection of the second capacitor plate element 22 to have a high gas permeability. For example, it is well known that silver has a high oxygen permeability. U.S. Pat. No. 5,472,527 entitled "High pressure oxidation of precursor alloys" issued on Dec. 5, 1995 discloses the oxygen permeability of silver.

FIG. 16 illustrates the process step 213 of drawing the second capacitor plate element 22 with first capacitor plate element 12 for reducing the outer diameter 22D thereof and for forming a coaxial element 7 thereby.

Figure 19:
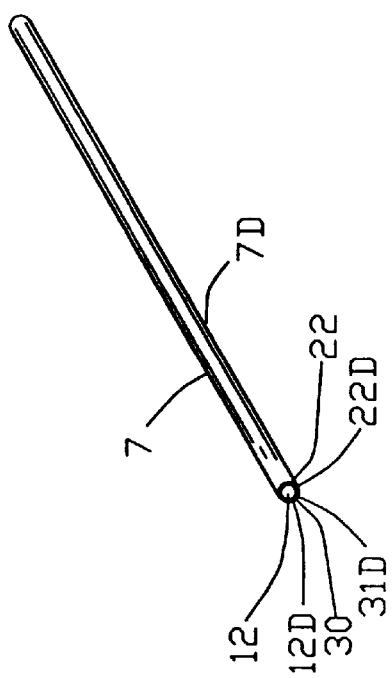
FIG. 19 is an isometric view after drawing the second capacitor plate element with the first capacitor plate element to form a capacitor element.
Figure 19A:
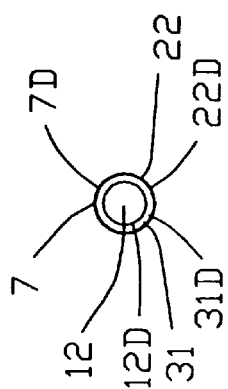
FIG. 19A is an enlarged end view of FIG. 19.

FIG. 19 is an isometric view after drawing the second capacitor plate element 22 with the first capacitor plate element 12. FIG. 19A is an enlarged end view of FIG. 19. Preferably, the process step 213 of drawing the second capacitor plate element 22 includes the successive drawing and annealing of the second capacitor plate element 22 with the first capacitor plate element 12 for reducing the outer diameter 7D of the coaxial element 7. The drawing the second capacitor plate element 22 moves the second capacitor plate element 22 into engagement with the first capacitor plate element 12 to form the coaxial element 7 thereby.

Figure 20:
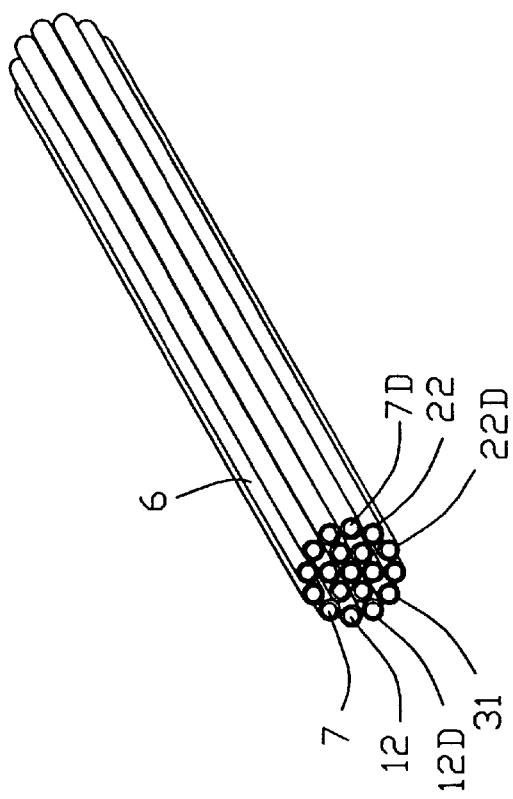
FIG. 20 is an isometric view of assembling a multiplicity of the coaxial elements into a parallel array.
Figure 20A:
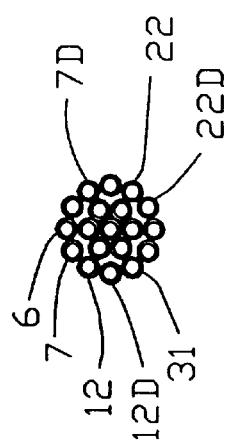
FIG. 20A is an end view of FIG. 20.

FIG. 16 illustrates the process step 214 of assembling the array 6 formed from a multiplicity of coaxial elements 7 in a substantially parallel configuration. FIG. 20 is an isometric view of a multiplicity of the coaxial elements 7 assembled into the parallel array 6 with FIG. 20A being an end view of FIG. 20. Preferably, 500 to 1000 of the coaxial elements 7 are arranged in a substantially parallel configuration to form the parallel array 6.

Figure 21:
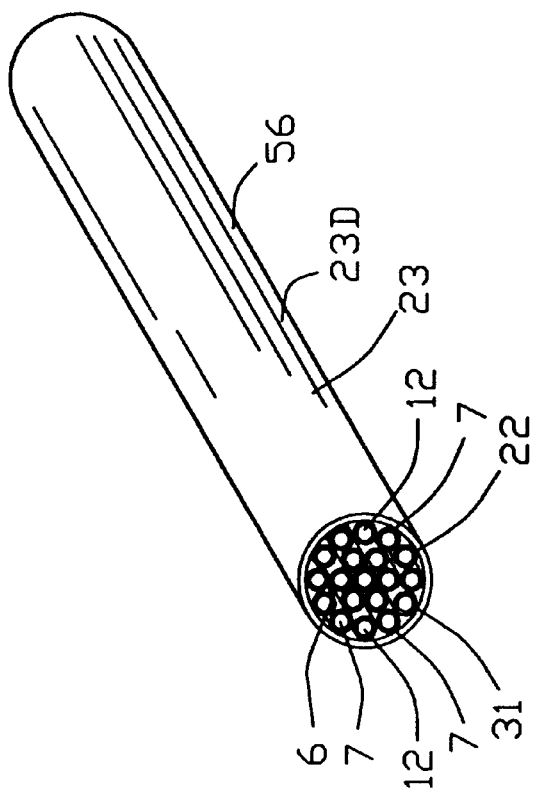
FIG. 21 is an isometric view of a second capacitor plate connector encasing the parallel array of the coaxial elements.
Figure 21A:
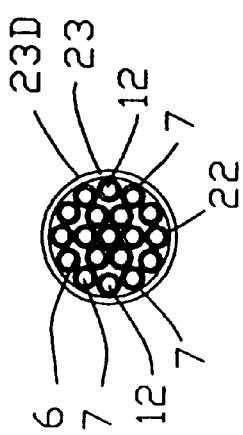
FIG. 21A is an end view of FIG. 21.

FIG. 16 illustrates the process step 215 of encasing the parallel array 6 of the multiplicity of coaxial elements 7 within the second capacitor plate connector 23. FIG. 21 is an isometric view of the second capacitor plate connector 23 encasing the parallel array 6 of coaxial elements 7 with FIG. 21A being an end view of FIG. 21. Preferably, the second capacitor plate connector 23 is in the form of a continuous metal tube having the same chemically properties as the second capacitor plate element 22. The second capacitor plate connector 23 encircles the array 6 to have a substantially circular cross-section defined by an outer diameter 23D. Preferably, the step of encasing the array 6 of the multiplicity of the coaxial elements 7 within the second capacitor plate connector 23 includes simultaneously inserting the array 6 of the multiplicity of the coaxial elements 7 within a preformed second metallic tube.

In the alternative, the second capacitor plate connector 23 may be a longitudinally extending sheet formed about the array 6 of the multiplicity of the coaxial elements 7 to have a substantially circular cross-section. In this alternative, the array 6 of the multiplicity of the coaxial elements 7 is encased by bending the longitudinally extending sheet of the second capacitor plate connector 23 about the array 6 of the multiplicity of the coaxial elements 7.

Figure 22:
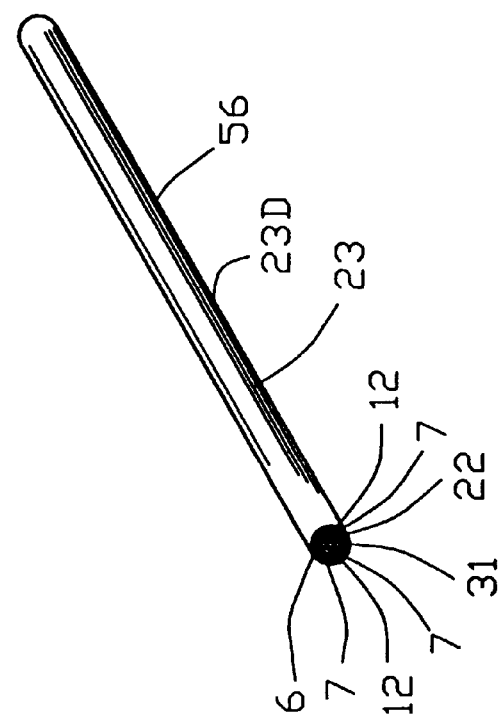
FIG. 22 is an isometric view after drawing the second capacitor plate connector with the parallel array of the coaxial elements therein for electrically interconnecting the second capacitor plate elements with the second capacitor plate connector to form a second capacitor plate.
Figure 22A:
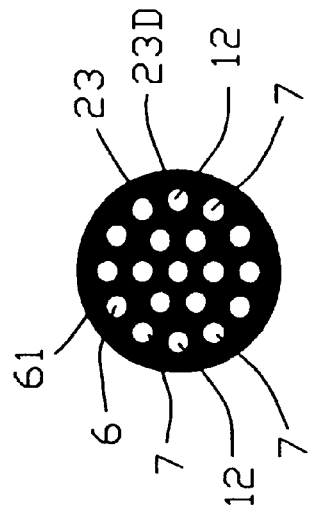
FIG. 22A is an enlarged end view of FIG. 22.

FIG. 16 illustrates the process step 216 of drawing the second capacitor plate connector 23 with the parallel array 6 of the coaxial elements 7 therein. FIG. 22 is an isometric view after drawing the second capacitor plate connector 23 with the parallel array 6 of the coaxial elements 7 therein for electrically interconnecting the second capacitor plate elements 22 with the second capacitor plate connector 23 to form the second capacitor plate 20. FIG. 22A is an enlarged end view of FIG. 22. Drawing the second capacitor plate connector 23 with the parallel array 6 of the multiplicity of the coaxial elements 7 therein reduces the outer diameter 23D of the second capacitor plate connector 23 and electrically interconnects the multiplicity of the second capacitor plate elements 22 with the second capacitor plate connector 23 to form the second capacitor plate 20. The process step 216 of drawing the second capacitor plate connector 23 with the parallel array 6 of the coaxial elements 7 therein provides three effects as previously set forth.

FIG. 16 illustrates the process step 217 of severing the parallel array 6 of the coaxial elements 7. FIG. 23 is an isometric view after severing the parallel array 6 of the coaxial elements 7 of FIG. 22 into a plurality of segments 61–64. FIG. 23A is an enlarged end view of FIG. 23.

The parallel array 6 of the coaxial elements 7 is severed into segments having a length for enabling the formation of the dielectric 30 between each of the first and second capacitor plates 12 and 22. More specifically, the coaxial elements 7 are severed into segments having a length sufficiently small for enabling a gas to permeate into the interior of the parallel array 6 of the coaxial elements 7 for enabling the formation of the dielectric 30. Furthermore, the coaxial elements 7 are severed into segments having a length sufficiently large to obtain the desired capacitance of the capacitor 5. In one example of the invention, the coaxial elements 7 are severed into segments having a length of 1 cm. The process step 217 may include the step of exposing a portion of each of the first capacitor plate elements 12 of the parallel array 6 of coaxial capacitor elements 6.

FIG. 24 is an isometric view after exposing the portion 60 of each of the first capacitor plate elements 12 of the parallel array 6 of the coaxial capacitor elements 8. FIG. 24A is an enlarged end view of FIG. 24. In one process of the present invention, the process of exposing the portion 60 of each of the first capacitor plate elements 12 of the parallel array 6 of the coaxial elements 7 includes chemically removing a portion of the second capacitor plate elements 22 and a portion of the second capacitor plate connector 23. Preferably, the second capacitor plate elements 22 and the second capacitor plate connector 23 are immersed into an acid for dissolving a portion of the second capacitor plate elements 22 and a portion of the second capacitor plate connector 23.

The second capacitor plate connector 23 has the same chemical properties as the second capacitor plate element 22. Since, the second capacitor plate element 22 and the second capacitor plate connector 23 have different chemically properties than the first capacitor plate element 12, a portion of the second capacitor plate elements 22 and a portion of the second capacitor plate connector 23 may be chemically removed without removal of the first capacitor plate element 12.

FIG. 16 illustrates the process step 218 of forming the dielectric material 30 between each of the first and second capacitor plate elements 12 and 22 in each of the coaxial elements 7. FIG. 25 is an isometric view illustrating the processes step 218 of forming the dielectric material 30 between each of the first and second capacitor plate elements 12 and 22. FIG. 25A is an enlarged end view of FIG. 25.

The processes step 218 of forming the dielectric material 30 comprises passing a gas through the second capacitor plate elements 22 and the second capacitor plate connector 23. The gas is passed through the second capacitor plate elements 22 and the second capacitor plate connector 23 to react with the first capacitor plate 12 to form the dielectric 30 thereby. When the dielectric 30 is formed, the parallel array 6 of coaxial elements 7 is transformed into a parallel array 6 of capacitor element 8.

FIG. 26 is a magnified view of a portion of FIG. 25A prior to the formation of the dielectric material 30. The first capacitor plate 12 is in engagement with the second capacitor plate elements 22. The first capacitor plate 12 is selected to react with the permeating gas to form the dielectric 30. The second capacitor plate elements 22 and the second capacitor plate connector 23 are selected to have a high gas permeability.

FIG. 26A is a magnified view of similar to FIG. 26 after the formation of the dielectric material 30. The gas permeates through the second capacitor plate elements 22 and the second capacitor plate connector 23 to react with the first capacitor plate 12. The reaction of the gas with the first capacitor plate 12 forms a dielectric 30 between the first capacitor plate 12 and the second capacitor plate elements 22.

In one example of the invention, oxygen is passed through the second capacitor plate elements 22 and the second capacitor plate connector 23 to oxidize the surface of the first capacitor plate 12. The oxidized surface of the first plate 12 forms an oxide layer to create the dielectric 30 thereby.

When the dielectric material 30 is formed between the first capacitor plate 12 and the second capacitor plate elements 22, the dielectric material 30 spaces each of the second capacitor plate elements 22 from each of the first capacitor plate elements 12 to form each of the coaxial capacitor elements 8 thereby.

In one example of the invention, the first capacitor element 12 is made from titanium (Ti). The second capacitor plate element 22 and the second capacitor plate connector 23 are made of silver. Oxygen gas permeating through the silver the second capacitor plate element 22 and second capacitor plate connector 23 forms a layer of titanium dioxide $TiO_2$ on the titanium first capacitor element 12 to form the dielectric 30 thereby.

In another example of the invention, the first capacitor element 12 is made from aluminum (Al). The second capacitor plate element 22 and the second capacitor plate connector 23 are made of silver. Oxygen gas permeating through the silver the second capacitor plate element 22 and second capacitor plate connector 23 forms a layer of Aluminum oxide $Al_2O_3$ on the aluminum first capacitor element 12 to form the dielectric 30 thereby.

FIG. 16 illustrates the process step 219 of interconnecting the multiplicity of the first capacitor elements 12 with the first capacitor plate connector 13 to form the first capacitor plate 10. The process step 220 is similar to the process step 120 previously described with reference to FIGS. 14 and 14A.

FIG. 16 illustrates the process step 220 of encapsulating the capacitor 5 of FIGS. 25 and 25A with the insulation covering 40. This process step 220 is similar to the process step 121 previously describe with reference to FIGS. 15 and 15A.

EXAMPLE 2

| first capacitor plate element (12) | |
|---|---|
| material | aluminum |
| initial diameter | 0.25 cm |
| final diameter | 0.025 cm |
| second capacitor plate element (22) | |
| material | silver |
| wall thickness | 0.025 cm |
| initial diameter | 0.3 cm |
| final diameter | 0.025 cm |
| second capacitor plate connector (23) | |
| material | silver |
| wall thickness | 0.025 cm |
| initial diameter | 0.3 cm |
| final diameter | 0.025 cm |
| insulator (30) | |
| material | aluminum oxide |
| thickness | 0.000001 cm |
| Capacitor (5) | |
| final physical dimensions | 0.025 cm × 1 cm |
| number of coaxial capacitors | 300 |
| capacitance | 2.0 $\mu F$ |

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved capacitor, comprising:

an array of a multiplicity of capacitor elements;

each of said multiplicity of capacitor elements comprising a first capacitor plate element surrounded by a second capacitor plate element with a dielectric material disposed therebetween;

said multiplicity of capacitor elements being initially formed by simultaneously drawing said multiplicity of capacitor elements with each of said first capacitor plate elements being surrounded by said second capacitor plate element with a spacer material disposed therebetween;

said multiplicity of capacitor elements being subsequently formed by simultaneously converting each of said spacer material to said dielectric material;

a first capacitor plate connector interconnecting each of said first capacitor plate elements of said multiplicity of capacitor elements to form a first capacitor plate; and a second capacitor plate connector interconnecting each of said second capacitor plate elements of said multiplicity of capacitor elements to form a first capacitor plate.

2. An improved capacitor as set forth in claim 1, wherein each of said first capacitor plate elements includes a metallic wire.

3. An improved capacitor as set forth in claim 1, wherein each of said first capacitor plate elements includes a metallic wire having a substantially circular cross-section.

4. An improved capacitor as set forth in claim 1, wherein said dielectric material includes an oxide on each of said first capacitor plate elements.

5. An improved capacitor as set forth in claim 1, wherein said dielectric material includes an insulator deposited on each of said first capacitor plate elements.

6. An improved capacitor as set forth in claim 1, wherein each of said second capacitor plate elements includes a metallic tube.

7. An improved capacitor as set forth in claim 1, wherein each of said second capacitor plate elements includes a continuous metallic tube about each of said first capacitor plate elements and said dielectric materials.

8. An improved capacitor as set forth in claim 1, wherein said first capacitor plate connector includes each of said first capacitor plate elements having an exposed portion; and said first capacitor plate connector interconnecting each of said exposed portions of each of said multiplicity of said first capacitor elements to form said first capacitor plate.

9. An improved capacitor as set forth in claim 1, wherein said second capacitor plate connector includes said multiplicity of said capacitor elements being disposed within a second metallic tube and being in electrical contact therewith.

10. An improved capacitor as set forth in claim 1, including an insulation covering encapsulating said capacitor for insulating said capacitor.

11. An improved capacitor, comprising:

a parallel array of a multiplicity of capacitor elements;

each of said multiplicity of capacitor elements comprising a first capacitor plate element surrounded by a second capacitor plate element with a dielectric material disposed therebetween to form a coaxial capacitor element;

said multiplicity of capacitor elements being initially formed by simultaneously drawing said multiplicity of capacitor elements with each of said first capacitor plate elements being surrounded by said second capacitor plate element with a spacer material disposed therebetween;

said multiplicity of capacitor elements being subsequently formed by simultaneously chemically converting said spacer materials to said dielectric material;

a first capacitor plate connector interconnecting each of said first capacitor plate elements of said multiplicity of capacitor elements to form a first capacitor plate; and a second capacitor plate connector interconnecting each of said second capacitor plate elements of said multiplicity of capacitor elements to form a first capacitor plate.

12. An improved capacitor as set forth in claim 11, wherein the first capacitor plate element includes a metallic wire.

13. An improved capacitor as set forth in claim 11, wherein the first capacitor plate element has a substantially circular cross-section.

14. An improved capacitor as set forth in claim 11, wherein said second capacitor plate connector includes said multiplicity of the second capacitor plate elements being diffusion welded into a substantially unitary material.

15. An improved capacitor as set forth in claim 11, wherein the simultaneous drawing of said multiplicity of capacitor elements diffusion welds the second capacitor plate elements to the second capacitor plate connector to form a substantially unitary material.

16. An improved capacitor as set forth in claim 11, wherein the spacing material is chemically removed from between the first and second capacitor plate elements and the dielectric material is chemically formed between the first and second capacitor plate elements.

17. An improved capacitor as set forth in claim 11, wherein the first capacitor plate element has different chemical properties than the chemical properties of the second capacitor plate element.

18. An improved capacitor as set forth in claim 11, wherein said dielectric material is an oxide of one of said first and second capacitor plate elements.

19. An improved capacitor as set forth in claim 11, wherein one of the first and second capacitor plate elements is oxygen porous; and said dielectric between the first and second capacitor plate elements comprising an oxide on one of the first and second capacitor plate elements.

* * * * *